United States Patent [19]

Wakayama et al.

[11] Patent Number: 4,833,597
[45] Date of Patent: May 23, 1989

[54] DICTIONARY/DIRECTORY MANAGEMENT METHOD IN DATABASE SYSTEM

[75] Inventors: Satoshi Wakayama, Kawasaki; Ichiro Yokoyama, Ebina; Kazuaki Tanaka, Sagamihara; Yoshito Kamegi, Yokohama; Mikihiko Tokunaga, Yokohama; Takeshi Kamoshida, Yokohama; Shigeru Yoneda, Ebina, all of Japan

[73] Assignee: Hitachi, Ltd., Tokyo, Japan

[21] Appl. No.: 7,410

[22] Filed: Jan. 27, 1987

[30] Foreign Application Priority Data

Jan. 27, 1986 [JP] Japan ................................. 61-13804

[51] Int. Cl.⁴ ........................ G06F 7/00; G06F 15/40
[52] U.S. Cl. .................................... 364/200; 364/300
[58] Field of Search ... 364/200 MS File, 300 MS File, 364/900 MS File

[56] References Cited

U.S. PATENT DOCUMENTS

| 4,429,385 | 1/1984 | Cichelli et al. | 364/900 |
| 4,455,619 | 6/1984 | Masui et al. | 364/900 |
| 4,506,326 | 3/1985 | Shaw et al. | 364/300 |
| 4,531,186 | 7/1985 | Kuapman | 364/300 |
| 4,558,413 | 12/1985 | Schmidt et al. | 364/300 |
| 4,627,019 | 12/1986 | Ng | 364/900 |
| 4,631,664 | 12/1986 | Bachman | 364/200 |
| 4,648,036 | 3/1987 | Gallant | 364/300 |

Primary Examiner—Gareth D. Shaw
Assistant Examiner—Joseph T. Fitzgerald
Attorney, Agent, or Firm—Antonelli, Terry & Wands

[57] ABSTRACT

In a database having a dictionary/directory, the dictionary/directory is processed to form a directory using information in the dictionary, or is processed for other purposes. A process record including identification information associated with the process is stored in the dictionary/directory. In a dictionary deletion process, the stored record is designated and read out such that associated information indicated by the process record is also deleted in a batch manner.

5 Claims, 19 Drawing Sheets

DICTIONARY/DIRECTORY MANAGEMENT METHOD IN DATABASE SYSTEM

BACKGROUND OF THE INVENTION

The present invention relates to a method of controlling a dictionary/directory of a database system, the control including alteration, addition, deletion and the like of the dictionary/directory.

In some database systems, a dictionary/directory system is provided which is used for defining the structure of a database and for controlling access to the database.

A dictionary/directory system is described, for example, in "Computer Surveys" Vol. 14, No. 2, June 1982, pp. 245-275 published by Association for Computing Machinery.

A dictionary stores definition information defining the structure of a database. A directory is obtained by converting part of the definition information stored in the dictionary into the form of a table which can be referenced easily during execution of a user program.

The dictionary is subjected to an addition, alteration or deletion process when changing the structure of the database. The directory is also changed so as to follow such process for the dictionary. Conventionally, the record of any change in the database has not been kept as a log.

Therefore, it has been difficult to ensure agreement between the contents of dictionary and directory, or when a dictionary is partially changed in its content, it has been difficult to correct the associated information in the dictionary and directory.

SUMMARY OF THE INVENTION

Therefore, it is a principle object of the present invention to solve the above problems and provide a dictionary/directory management method which readily ensures agreement between the contents of the dictionary and the directory when a process for altering the structure of the database is effected.

According to the present invention, a process record of formation, addition, alteration, deletion and the like, with respect to both the dictionary and the directory, is retained in the dictionary/directory. When the user issues a command, such as deletion of definition information, the definition information involved is detected using the process record to perform the process designated by the command. Thus, it is possible to conduct the process without error and in a batch manner.

DESCRIPTION OF THE PREFERRED EMBODIMENT

An embodiment of the present invention will be described with reference to FIGS. 1 to 23.

Figure 1:
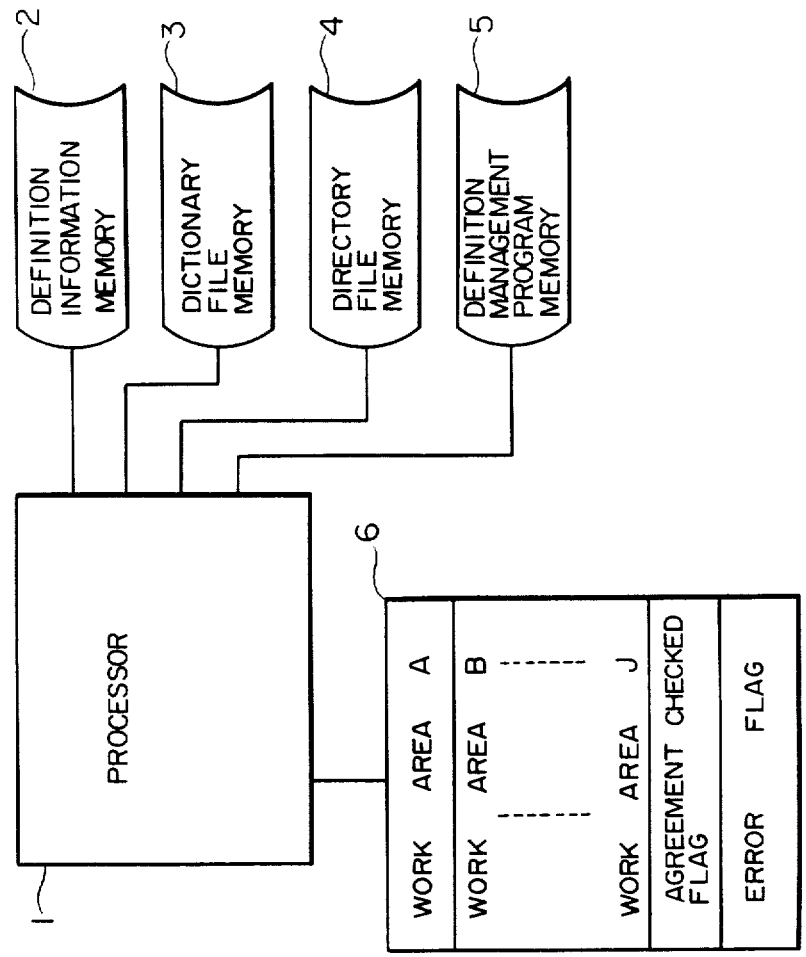
FIG. 1 shows the hardware arrangement of an embodiment according to the present invention.

Shown in FIG. 1 is an example of the hardware arrangement by which a dictionary/directory, maintenance/ management system of the invention can be realized. Reference numeral 1 denotes a processor which carries out various processes such as a search for necessary information. A definition information memory 2 stores definition information, a dictionary file memory 3 stores a dictionary, a directory file memory 4 stores a directory, and a definition management program memory 5 stores programs on dictionary/directory, and maintenance/management according to the present invention. A work area 6 stores information searched intermediately in a series of operations.

The definition specification of the database has been used in conformity with the ISO (X3H2-84-48) Network Database Language.

In the present system, the dictionary determines the overall structure of the database, while the directory has the structure derived from the dictionary so that the user can readily use the dictionary. The logical structure of a database is defined using a record type defining records contained in the database, a component type defining fields constituting the record, and a set type defining sets which indicate a relationship between records. The logical structure of the database defined as above is called a logical schema. The structure obtained by re-defining part of the logical schema is called a subschema.

A subschema is defined by a record view in correspondence with the record type of a logical schema, a component view in correspondence with the component type, and a set view in correspondence with the set type. A subschema is constructed for each user who can access the database within the range of the user's subschema.

Figure 2:
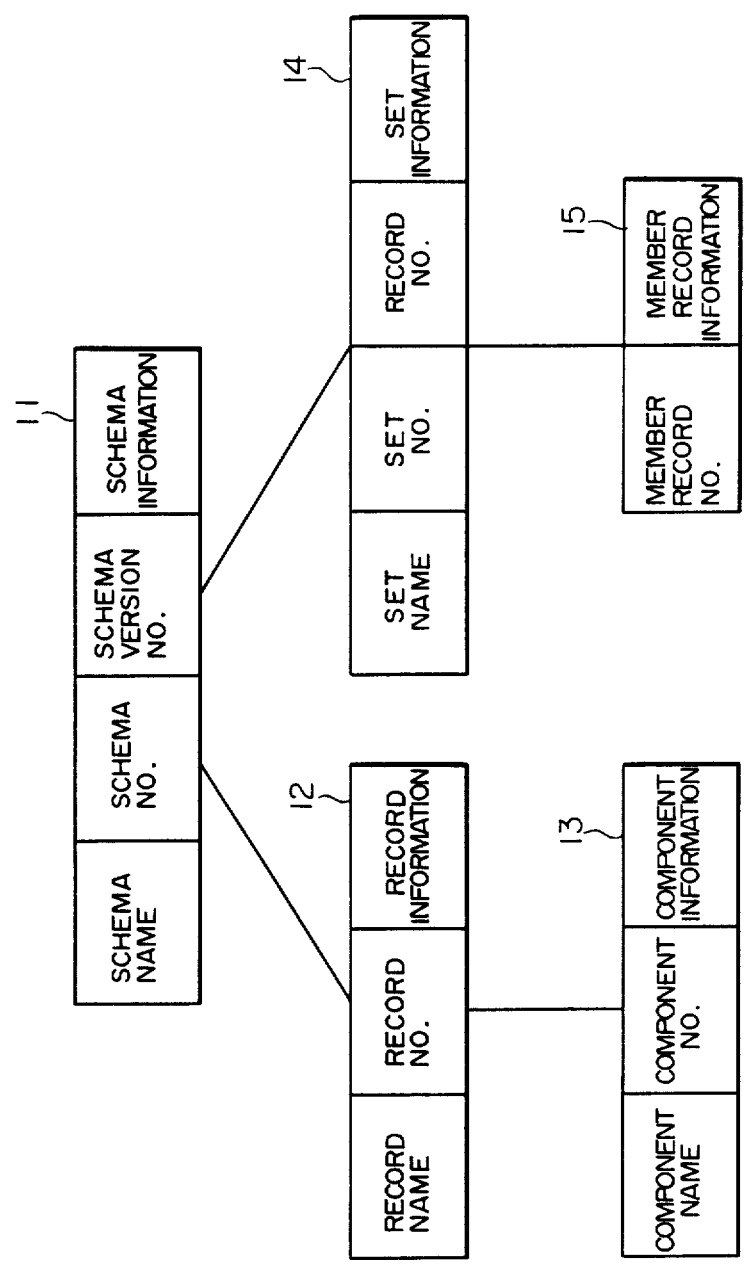
FIG. 2 shows an example of the construction of schema definition information under management of a dictionary.

Logical schema and subschema are each given a name and a version number to store them in a dictionary. The structure of a dictionary into which definition information of the logical schema is stored, is shown in FIG. 2. Stored in a record 11 are a schema name, a schema number unambiguously determined within the system, a schema version number, and schema information related to the entirety of the logical schema. Stored in a record 12 are record names, record numbers unambiguously determined within the logical schema, and the other record information for use in management of records. Stored in a record 13 are component names, component numbers unambiguously determined within the record, and component information. Stored in a record 14 are set names, a set number unambiguously determined within the logical schema, record numbers of the owner records serving as parent of the sets, and set information. Stored in a record 15 are record numbers of the member record serving as child of the sets, and member record information. A set relationship in the dictionary appears between records 11 and 12, records 12 and 13, records 11 and 14, and records 14 and 15, respectively.

Figures 3, 4:
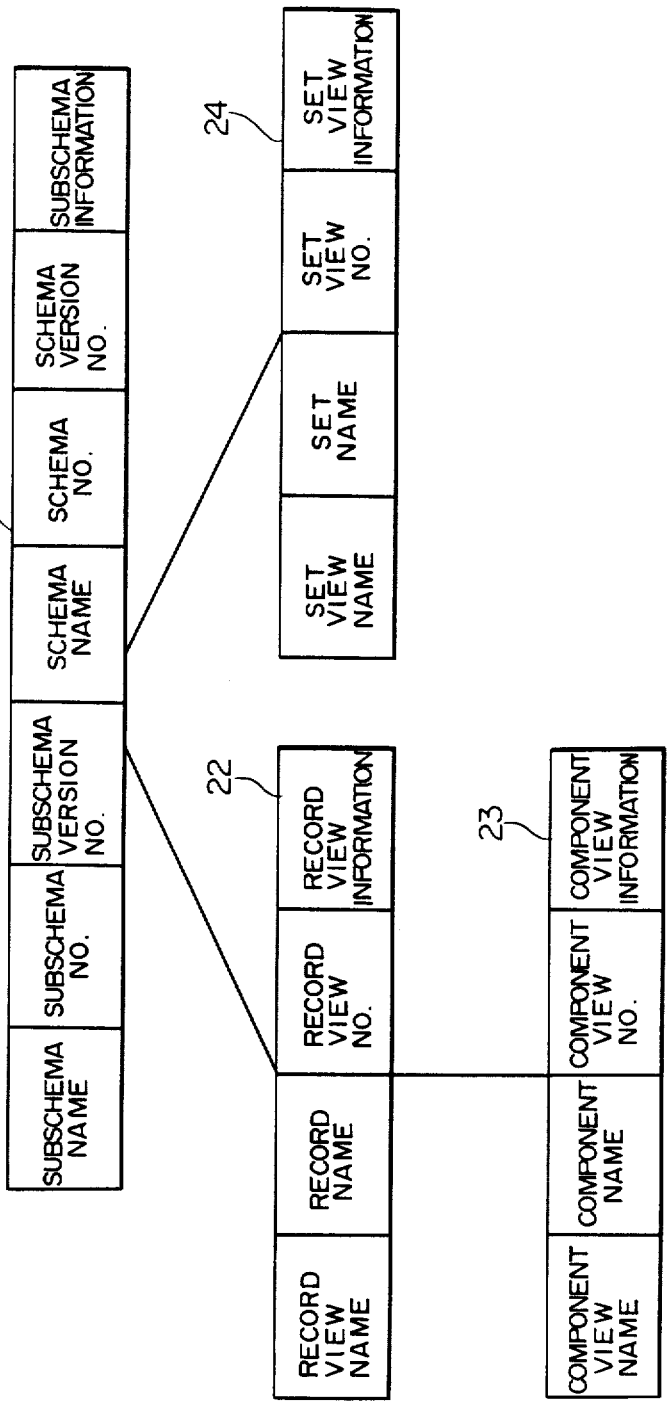
FIG. 3 shows an example of the construction of sub-schema definition information under management of a directory.
FIG. 4 shows an example of the construction of generation number under management of the dictionary.

Similarly, the structure of part of a dictionary into which definition information of the subschema is stored, is shown in FIG. 3. A subschema defines the structure of part of the database for each user program, within which the user program can access. Stored in a record 21 are a subschema name, a subschema number unambiguously determined within the subschema, a subschema version number, a schema name, a schema version number, and subschema information related to the entirety of the subschema. Stored in a record 22 are record view names, record view numbers unambiguously determined within the subschema, record names corresponding to the record views, and record view information provided for each record for use in management. Stored in a record 23 are component view names, component view numbers unambiguously determined within the record views, component names corresponding to the component views, and component view information in units of component view. Stored in a record 24 are set view names, set view numbers unambiguously determined within the subschema, set names and set numbers corresponding to the set view, and set view information in units of set view. A set relationship in the dictionary appears between records 21 and 22, records 22 and 23, and records 21 and 24, respectively.

A subschema identified by its name and version number is formed based on a logical schema identified by its name and version number. If both the logical schema and the subschema agree with each other (or are not contradictory with respect to their definition information), this pair of logical schema and subschema is given a generation number.

A different generation number is given to a pair having the same name but different version numbers.

The structure of the dictionary where a generation number is stored, is shown in FIG. 4. In the Figure, stored in another record are a schema number and a version number respectively of a logical schema, a subschema number and a version number respectively of the subschema, and the generation number.

The definition information stored in the dictionary is edited into a format, i.e., a directory table by the directory formation program such that the edited format can be easily referred to by the database management program during execution, and stored in the directory file. Together with loading the edited definition information, the generation number of the dictionary used is also loaded in the directory file.

Figure 5:
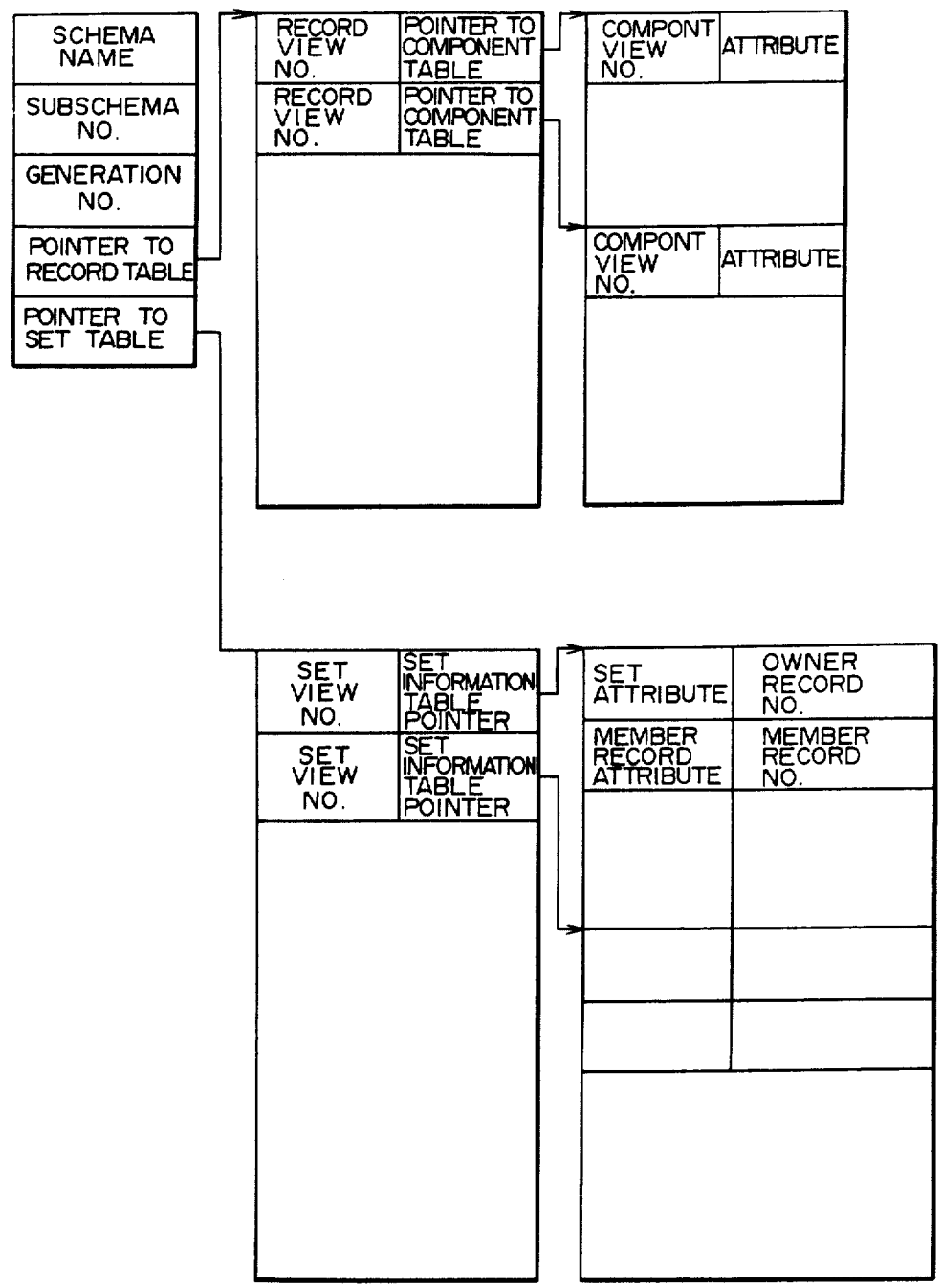
FIG. 5 shows an example of the construction of the directory formed using the data shown in FIGS. 2 and 3.

An example of the structure of the directory table is shown in FIG. 5.

View information is divided into the same type, and each type is collected to form a table. The table is formed such that the order of arrangement of each independent information in the table coincides with its view number in the dictionary.

A definition management program is used for storing definition information into the dictionary/directory, deleting definition information from the dictionary/directory, and so on.

The user of the dictionary/directory must supply the following command and definition information in the definition management program.

In case of storing definition information in the dictionary, use an ENTRY command, for example,

* ENTRY DICTIONARY and designate

[dictionary member type] and [definition information]

[dictionary member type] indicates a definition unit among several definition units into which the definition information in the dictionary is divided. [definition information] is the definition information to be stored in the dictionary.

Similarly, in case of deleting definition information from the dictionary, use a DELETE command, for example,

* DELETE DICTIONARY and designate

[dictionary member type] and [definition information name]

[definition information name] is an identification name of definition information contained in the stored definition information.

In case of checking the agreement between definition information in the dictionary, use a CHECK command, for example,

*CHECK DICTIONARY and designate

[dictionary member type] and [definition information name]

In this case, [dictionary member type] and [definition information name] designate a subordinate one of definition information to be checked with respect to its agreement. For instance, in case of schema and subschema, the latter is designated.

In case of forming a directory, use an ENTRY command, for example,

*ENTRY DIRECTORY and designate

[directory member type] and [definition information name]

[directory member type] designates a directory table to be formed.

Similarly, in case of deleting a directory, use a DELETE command, for example,

*DELETE DIRECTORY and designate

[directory member type] and [definition information name]

Figure 6:
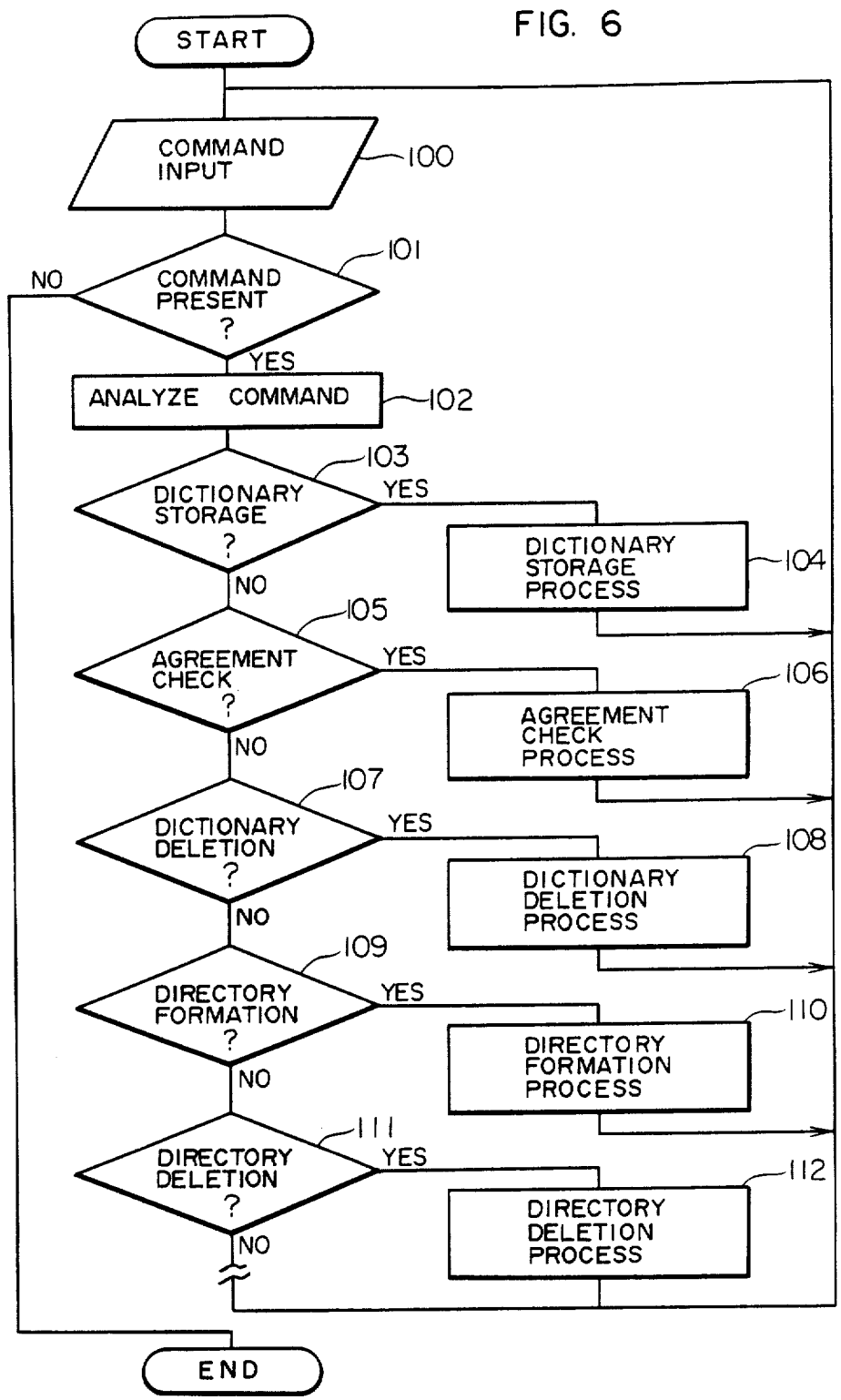
FIG. 6 is a flow chart showing an example of the overall process performed by a definition management program.

The process of the definition management program actuated by a command will now be described referring to the flow chart of FIG. 6.

Upon actuation of the definition management program, a process of reading definition information from the definition information memory 2 in units of command and storing it in the work area A, is executed (100). If there is no command (101, No), the process is terminated. If there is a command (101, Yes), the analysis of the command is conducted (102). In case of a dictionary storage command (103), a dictionary storage process is performed (104) and control returns to the start of the program. Similarly, in case of an agreement check command for definition information in the dictionary (105), an agreement check process is performed (106). In case of a dictionary deletion command (107), a dictionary deletion process is performed (108). In case of a directory formation command (109), a directory formation process is performed (110). In case of a directory deletion command (111), a directory deletion process is performed (112).

Figure 7:
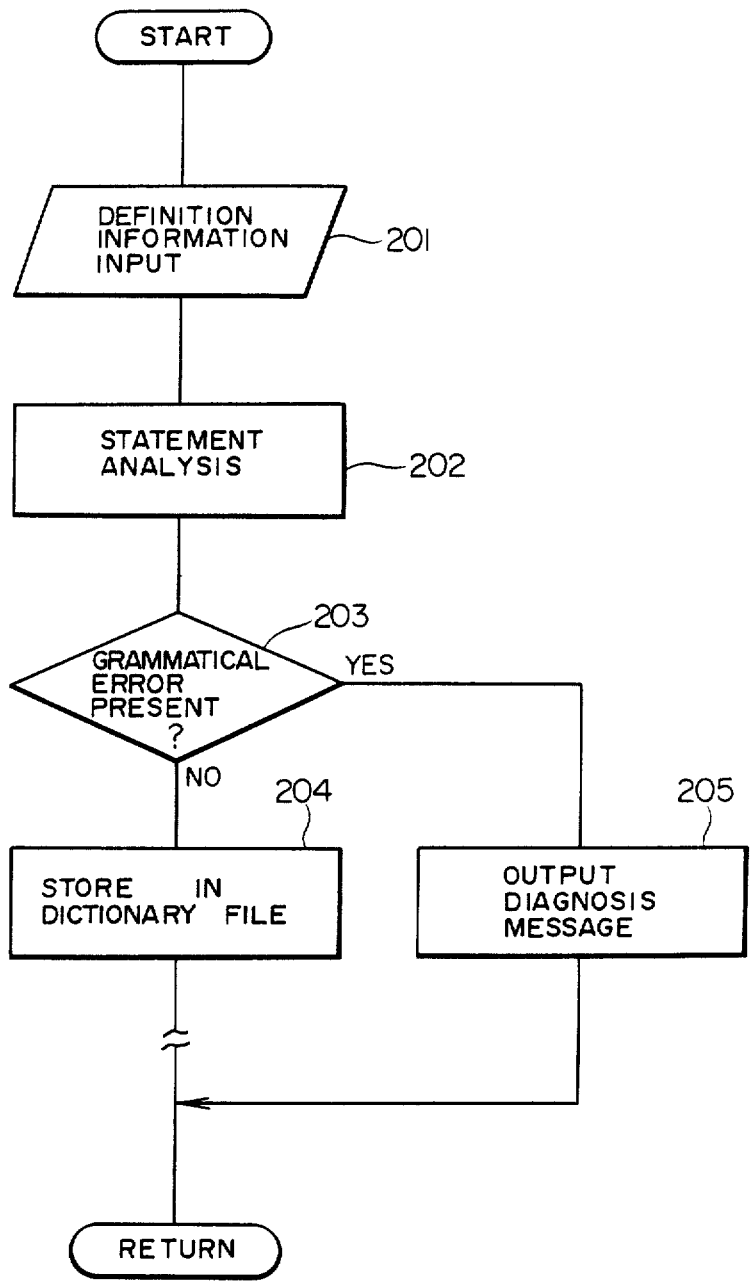
FIG. 7 is a flow chart showing an example of the dictionary storage process of FIG. 6.

The dictionary storage process will be described briefly with reference to FIG. 7.

Upon actuation of the dictionary storage process routine, definition information to be stored in the dictionary is read from the definition information memory and stored into the work area B (201). The inputted definition information is analyzed (202), and if there is a grammatical error (203), a diagnosis message is outputted to terminate the process (205).

If the inputted definition information is grammatically correct, it is stored in the dictionary file memory of data structure type (204). In this embodiment, if a subschema storage process is conducted, schema information is entered in the subschema record. If a schema is not present at that time, a virtual schema name is entered, while the schema number and the schema version number remain empty because they are still uncertain. The schema number and schema version number are entered in the subschema record when checking agreement.

Figure 8:
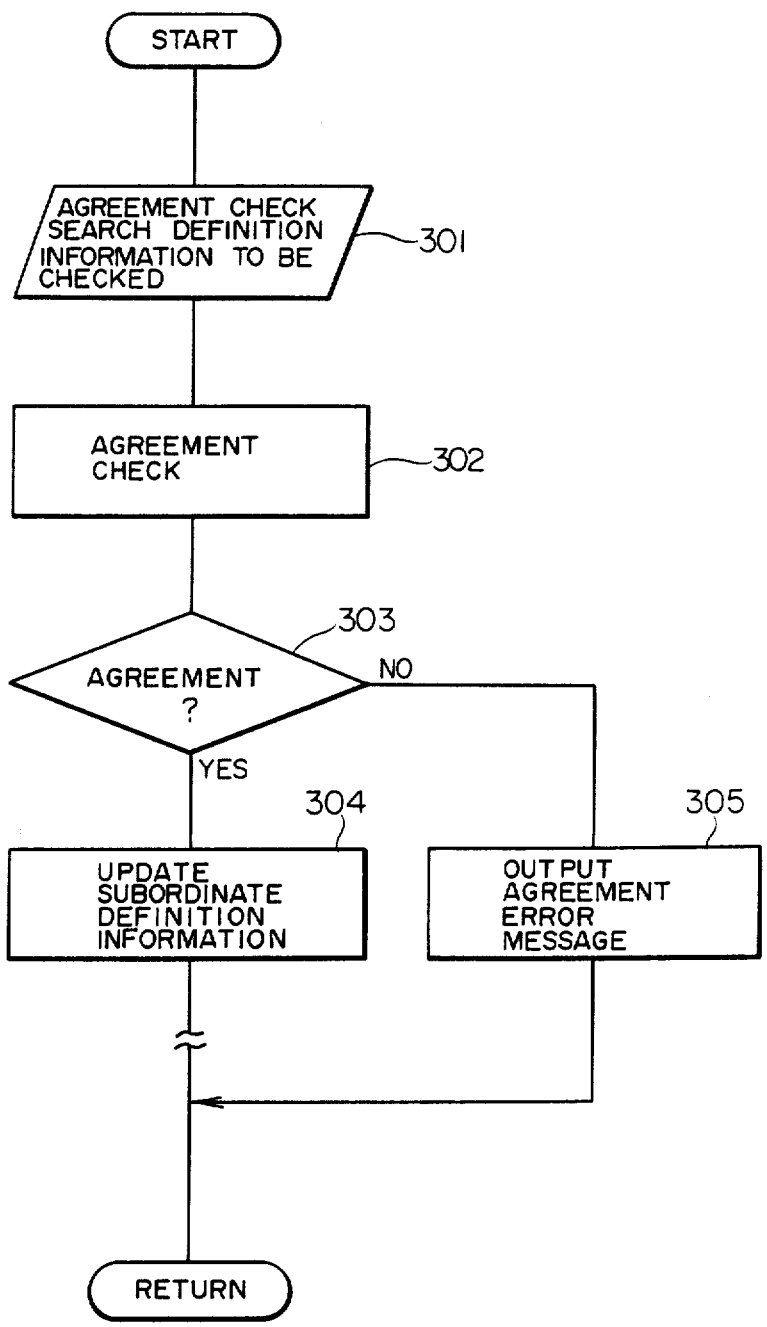
FIG. 8 is a flow chart showing an example of the agreement check process of FIG. 6.

An outline of the agreement check process will be described in connection with the flow chart of FIG. 8.

Upon actuation of the agreement check process routine, definition information whose agreement is to be checked is searched from the dictionary (301). An agreement is checked between searched definition information (302). If no agreement is met, an agreement error message is outputted to terminate the process (305). If an agreement is met, principal definition information, e.g., in case of schema and subschema, schema definition information, is entered in subordinate definition information, e.g., in the above case, subschema definition information, to thereby update the dictionary (304).

In practice, the schema number and the schema version number are entered in the subschema record to update the dictionary.

Figure 9:
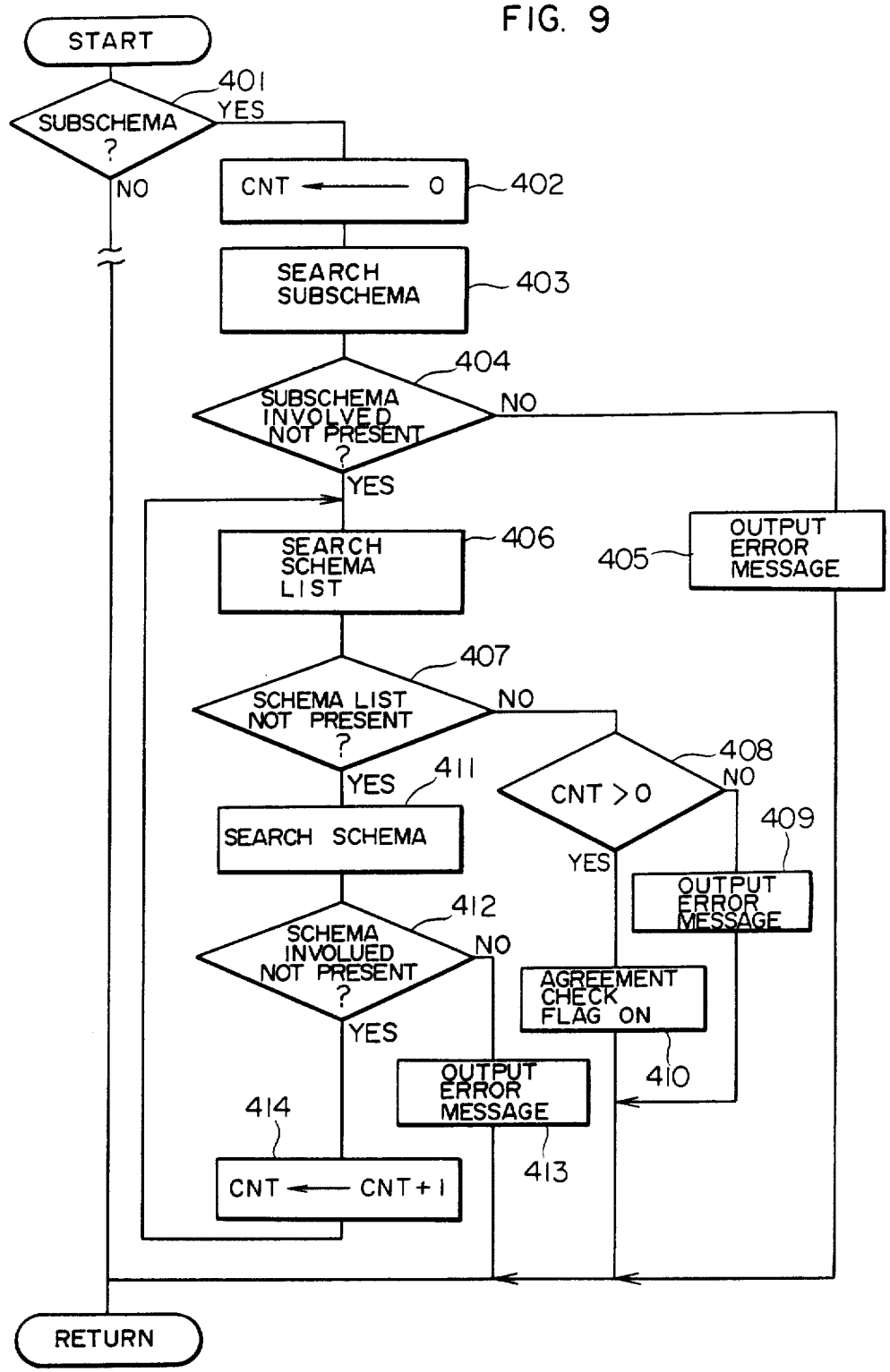
FIG. 9 is a detailed flow chart showing an example of the agreement check process of FIG. 8, wherein a sub-schema definition is incorporated as an example.

The above process will be described in more detail in connection with the flow chart of FIG. 9 wherein definition information of schema and subschema is exemplarily introduced.

Upon actuation of the agreement check process routine, on condition that an agreement between schema and subschema is to be checked (401), a counter CNT is set at 0 (402) and thereafter, a subschema record is searched using as a key the name of the definition information of the command (403).

The counter is used by a check program to confirm if an agreement has been checked or not, and is implemented in an memory area allocated to the check program.

If the subschema involved is not present in the dictionary (404), an error message is outputted to terminate the process (405).

If a subschema involved is found, a schema list record using the subschema as the parent record is searched (406). The schema list record is a record having a list of schema in the dictionary. If there is not the schema list record (407) and if the counter CNT is more than 1 (408), then the agreement check flag in the subschema record in the dictionary is set ON (410) to thereafter normally terminate the agreement check process. If the counter CNT is 0, an error message is outputted to terminate the process (409).

If a schema list record is found, a schema record in the schema list record is searched using as a key the schema name (411).

If there is no schema record involved in the dictionary (412), an error message is outputted to terminate the process (413).

If the schema record involved is found, the counter CNT is incremented by 1 (414). The schema list is searched to confirm if a further schema involved is present or not (406). If there is no further schema, control advances to step 408. In this case, since the counter CNT is more than 1, the agreement check flag is set ON (410) to enter the schema number and the schema version number in the subschema record to thereby terminate the agreement check process.

Figure 10:
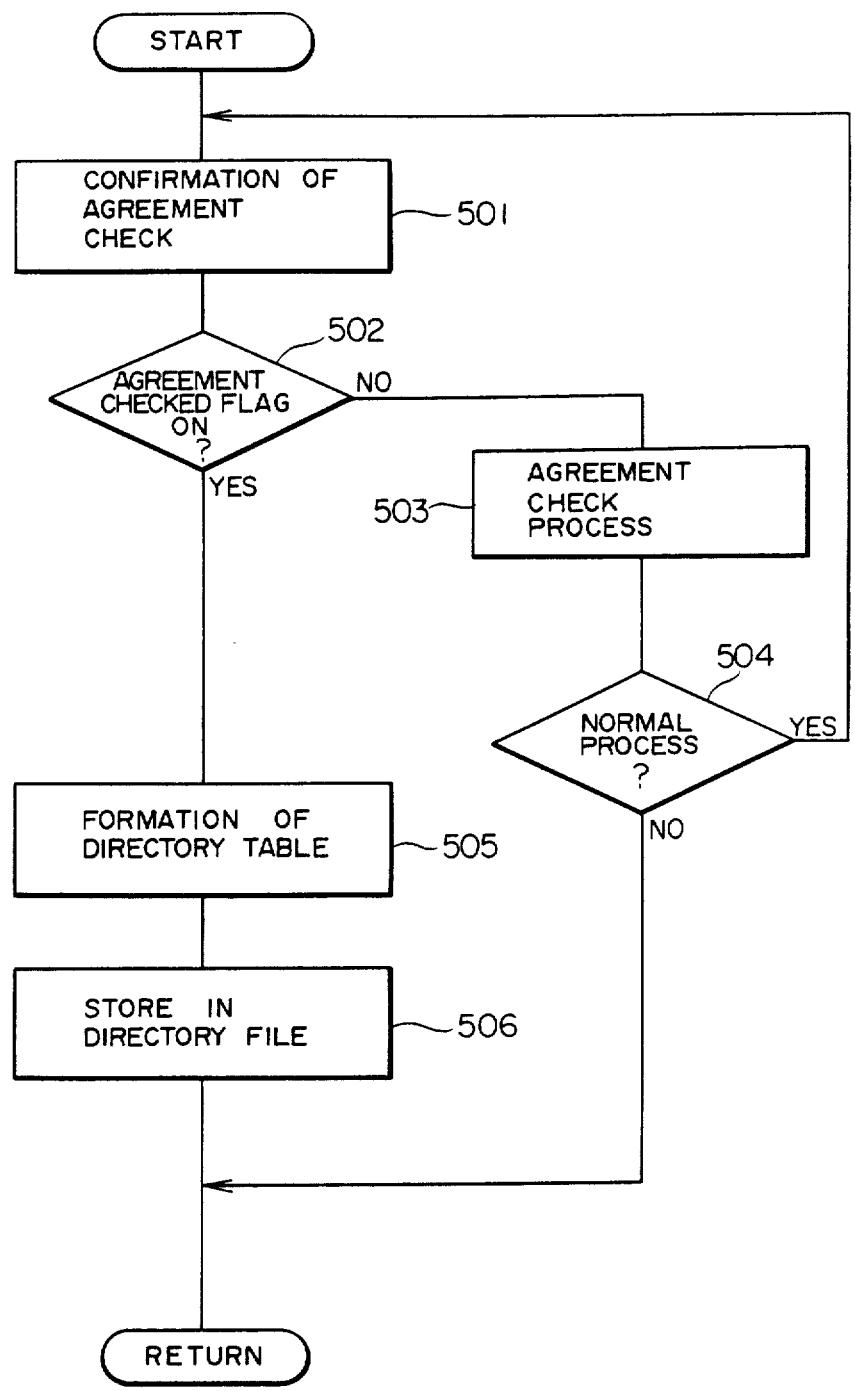
FIG. 10 is a flow chart showing an example of the directory formation process of FIG. 6.

An outline of the director formation process will be described in connection with the flow chart of FIG. 10.

Upon actuation of the directory formation process routine, an agreement between definition information to be used in forming a directory, is checked (501). If an agreement has not been checked (502), an agreement check process is executed (503) and if the check process has been executed ordinarily, the process after step 501 is repeated. If the process has not been executed ordinarily, the process is terminated.

If an agreement has been checked (502), a directory table is formed (505) to thereafter store it in the directory file memory (506).

Figure 11:
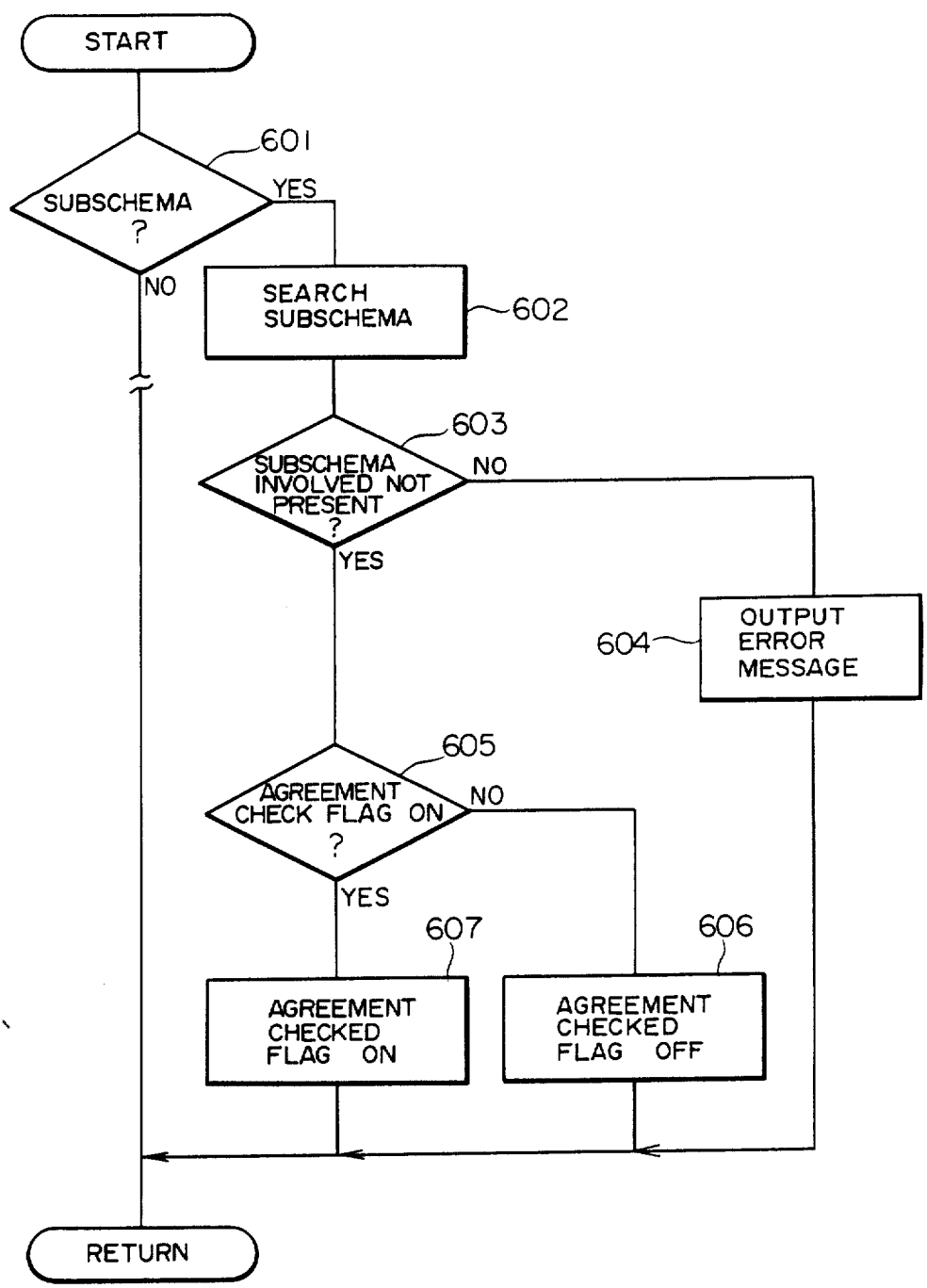
FIG. 11 is a flow chart showing an example of the judgment routine for judging if the agreement has been checked or not, in the directory formation process of FIG. 10.

The method of confirming an agreement (501) will be described in detail in connection with the flow chart of FIG. 11 wherein a directory table is formed based on subschema definition information.

First, if a command indicates that a directory table is to be formed based on subschema definition information (601), a subschema record is searched from the dictionary file memory using as a key the definition information name of the command (602).

If there is no record involved (603), an error message is outputted to terminate the process (604).

If there is a subschema record involved (603), the agreement check flag in the record is checked (605). If the flag is ON (607), the agreement checked flag is set ON, while if the check flag is OFF, the agreement checked flag is set OFF (606), to respectively terminate the process.

Figure 12:
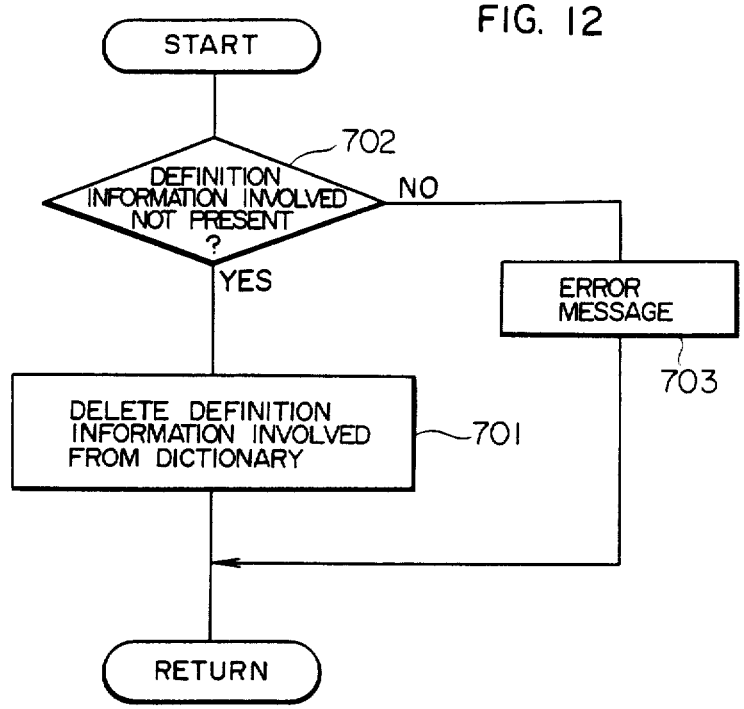
FIG. 12 is a flow chart showing an example of the dictionary deletion process of FIG. 6.

An outline of the dictionary deletion process will be described in connection with the flow chart of FIG. 12.

Upon actuation of the dictionary deletion process routine, definition information in the dictionary identified by the dictionary member type and the definition information name of the command is deleted (701). If there is no definition information involved (702), an error message is outputted to terminate the process (703).

Figure 13:
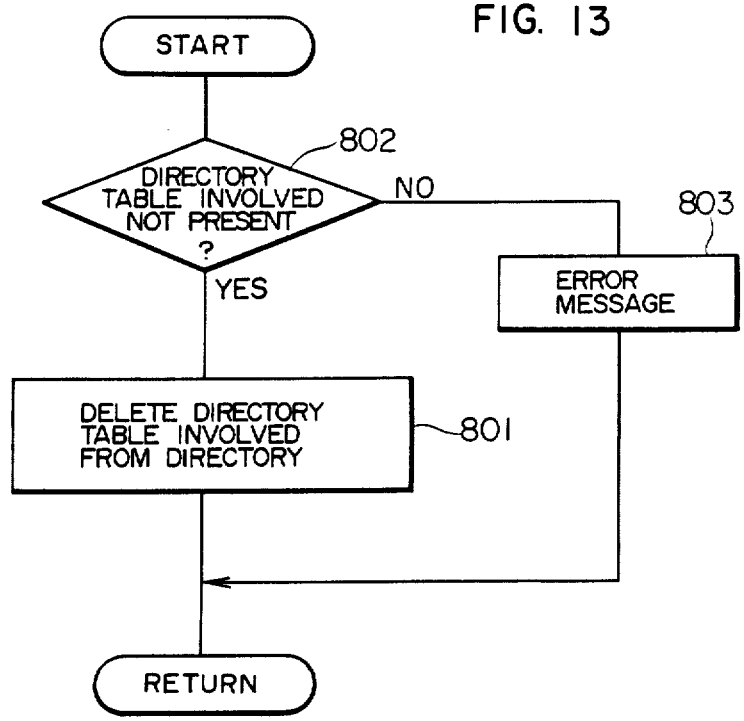
FIG. 13 is a flow chart showing an example of the directory deletion process of FIG. 6.

An outline of the directory deletion process routine will be described in connection with the flow chart of FIG. 13.

Upon actuation of the directory deletion process routine, the directory table in the directory identified by the directory member type and the definition information name of the command is deleted (801). If there is no directory table involved (802), an error message is outputted to terminate the process (803).

Figure 14:
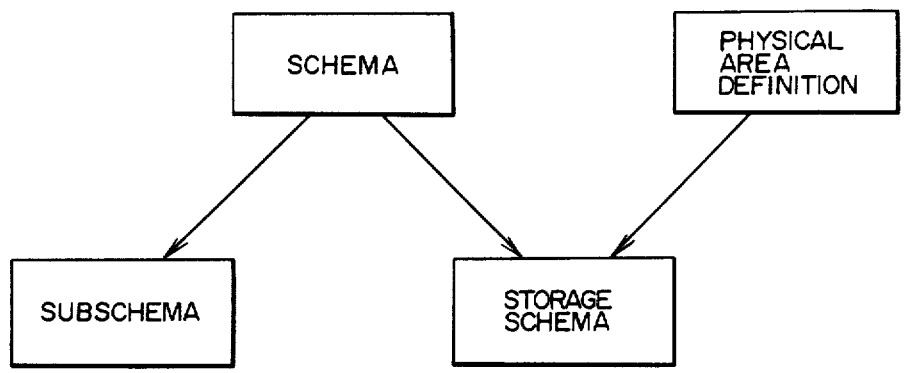
FIG. 14 shows the logical relationship between members stored in the dictionary.
Figure 15:
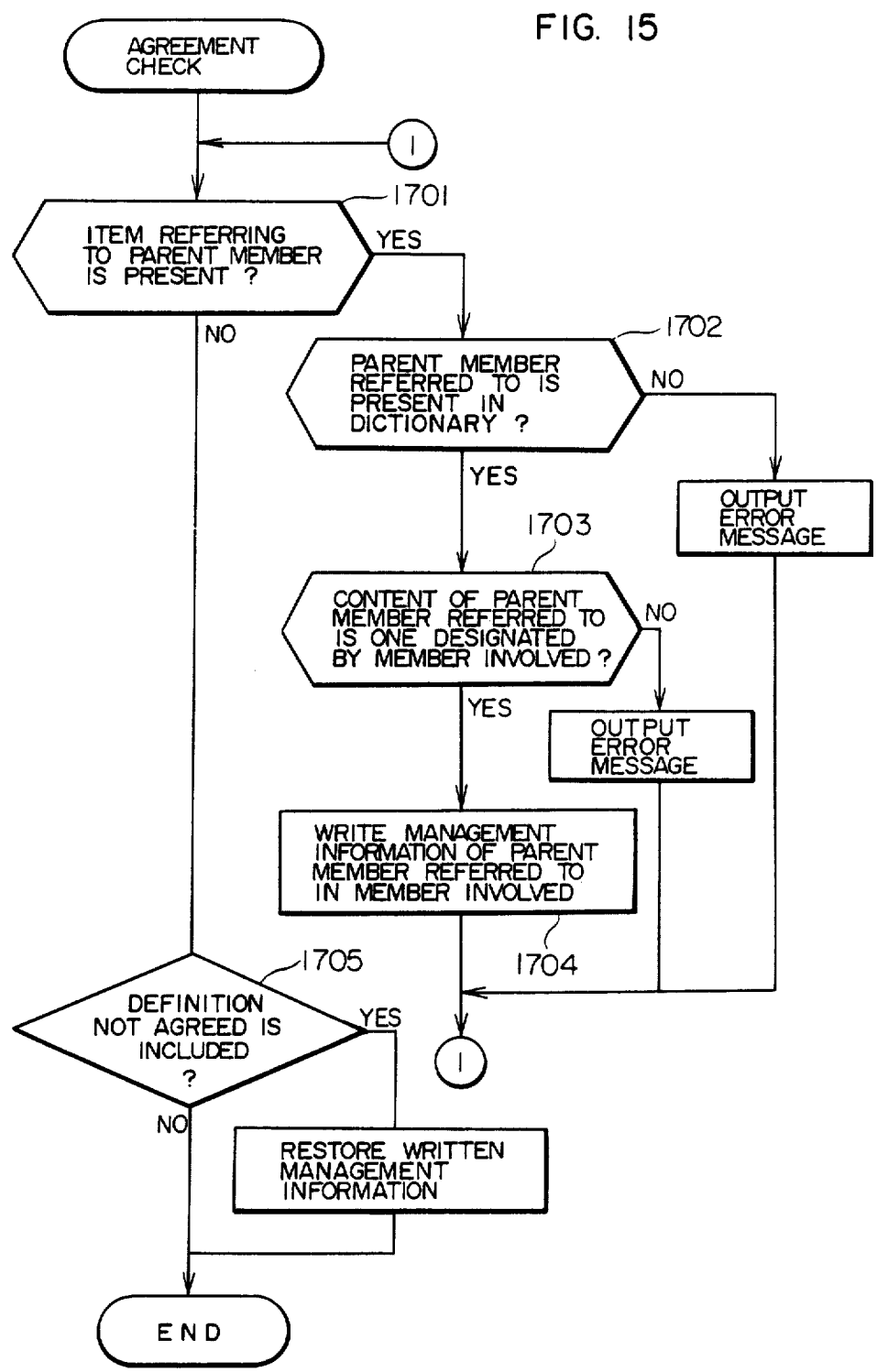
FIG. 15 is a flow chart showing an example of the agreement check process using the relationship of FIG. 14.
Figure 16:
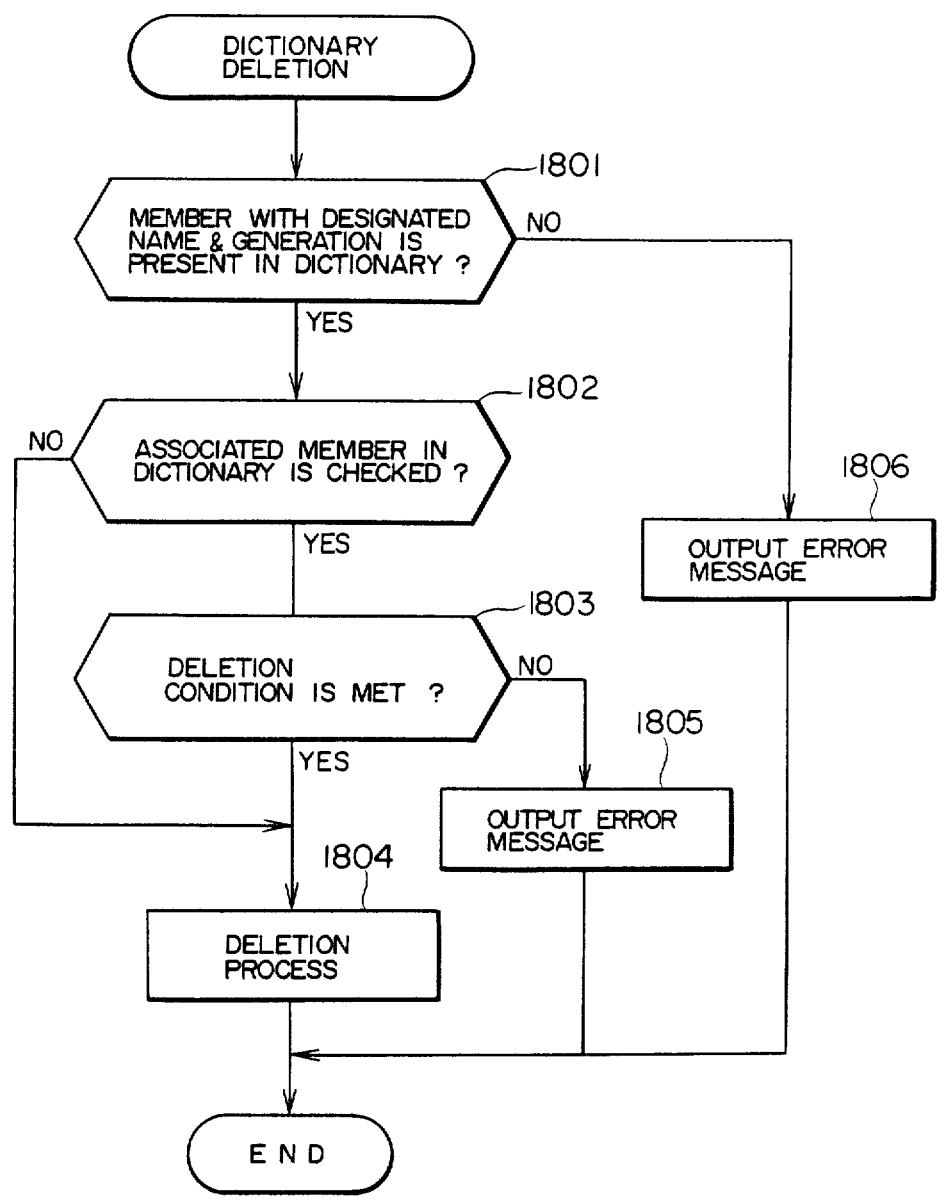
FIG. 16 is a flow chart showing an embodiment of an erroneous operation prevention process according to the present invention, wherein the dictionary deletion process is incorporated as an example.

FIG. 14 shows the logical layers of members stored in the dictionary. FIG. 15 is a flow chart showing the operation of the dictionary check process. FIG. 16 is a flow chart showing the operation of the dictionary member check associated with the dictionary deletion.

In the logical layers shown in FIG. 14, included as the members stored in the dictionary are the definitions of schema defining the logical structure of the database, storage schema defining the storage method (e.g., if an index is given or not), and physical definition. "Member" means the storage unit of definitions.

The schema definition and the physical area definition have an item in each definition, which item refers to the definition name or definition content of another definition statement. Therefore, these definitions can be independently defined and are located at the highest level. On the other hand, the subschema definition has an item referring to the schema definition name and content, and the storage schema definition has an item referring to the physical area definition name and content. Therefore, these definitions are located at a lower level than that of the schema definition and the physical area definition. Of this layer relationship, the upper level member is called a parent member, while the lower level member is called a child member. If a parent member is deleted or updated, its child member is correspondingly affected. Similarly, the layers of all the definitions under management of the dictionary are defined to manage the layer relationship between members in the dictionary. Mere storage of members in the dictionary does not define a mutual relation between members as shown by the layers of FIG. 14, so that deletion or update of members can be carried out freely without any limitation. The term "mutual relation" indicates in practice that the lower members are stored having a content referring to the upper members.

The operation of the agreement check process will be described with reference to FIG. 15. The agreement check is performed using the child member as its objective.

Upon request of an agreement check, a dictionary member of the latest generation having the name designated by the request, is searched, and it is checked if there is an item referring to the definition name or content of the parent member (1701).

It is checked whether the parent member referred to is stored as a dictionary member (1702). If it is stored, the process continues, whereas if it is not stored, an error message is outputted.

There are cases where the content of an item referring to the parent member does not agree with the definition content of the parent member.

For instance, between schema and storage schema shown in FIG. 14, there are cases where a record designating a storage method in the storage schema as a child member is not defined in the schema, and where the attribute of a component designated as a key in the storage schema is not correct.

For such cases, it is checked to see if the content of the parent member referred to agrees with the content designated by the child member (1703). If they agree, management information of the parent member referred to in the dictionary is written in the child member as checked information (1704). If they do not agree, an error message is outputted indicating the statement number of the parent member and its incorrect content.

If all the parent members referred to are checked normally, the agreement check terminates in a normal condition. If there is any disagreement, the management information of the parent member written in the child member is restored therefrom to retain an original state before the agreement check (1705).

Figure 23:
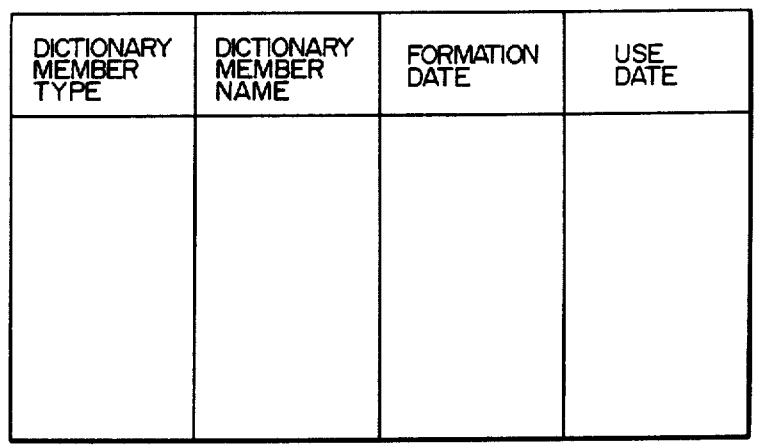
FIG. 23 shows the format of confirmation record with respect to dictionary member agreement.

At the normal termination of an agreement check, a record obtained after checking the agreement between definitions is made as shown in FIG. 23. The record includes a dictionary member type (a type of a stored member, e.g., subschema), a dictionary member name, a formation date, and a use date.

Thus, it is now possible to form a directory.

Each member stored in the dictionary is subjected to dictionary storage, dictionary check and directory formation. These three processes take the following states:

(1) By the "dictionary storage" process, members are merely stored in the dictionary. In this state, these numbers do not have the layer relationship as shown in FIG. 14.

(2) By the "dictionary check" process, information on members whose agreement has been checked is written, and the members have the layer relationship as shown in FIG. 14.

(3) The "directory formation" process is executed only when the "dictionary check" process has ensured an agreement between members. Management information (to be described later with FIG. 21) on each member is written in the formed directory member as member information constituting the dictionary member.

An error preventing process will be described with reference to FIG. 16, wherein a dictionary deletion process is used as an example. The flow chart of FIG. 16 shows the process which after judging if a particular dictionary member may be deleted, is executed in response to a deletion command.

Upon request of deleting a particular dictionary member, the dictionary member having the designated member name and generation is searched from the dictionary (1801). If a designated dictionary member is not present, an error message is outputted to terminate the dictionary deletion process. If present and in the case of an unconditional deletion request (1802, No), the dictionary deletion process proceeds (1804) and terminates. If present and in the case of a check request during deletion, dictionary members using the dictionary member to be deleted are checked. If there is any dictionary member using the dictionary member to be deleted, then it is determined that a deletion condition is not met (1803, No) to output an error message (1805) and terminate the process. If there is any dictionary member, it is determined that a deletion condition is met (1803, Yes), to accordingly delete the dictionary member concerned. If there is any dictionary member using the dictionary member to be deleted, management information (member name such as schema name, subschema name, formation date and so on) of the directory member used is recorded in the directory member using the former directory, as described previously. Therefore, a judgment if there is any dictionary member is conducted by searching those dictionary members having the member name and formation date of the dictionary member to be deleted. (However, in case where the member name of the dictionary member to be deleted is recorded but the recorded formation date is later than that of the dictionary member to be deleted, the deletion condition is assumed to be met since the dictionary member to be deleted is older information for the dictionary member using the former dictionary member.)

Associated members in the dictionary are checked as above so that an erroneous operation by the user can be avoided and an agreement between definitions in the dictionary can be assured.

Figure 17:
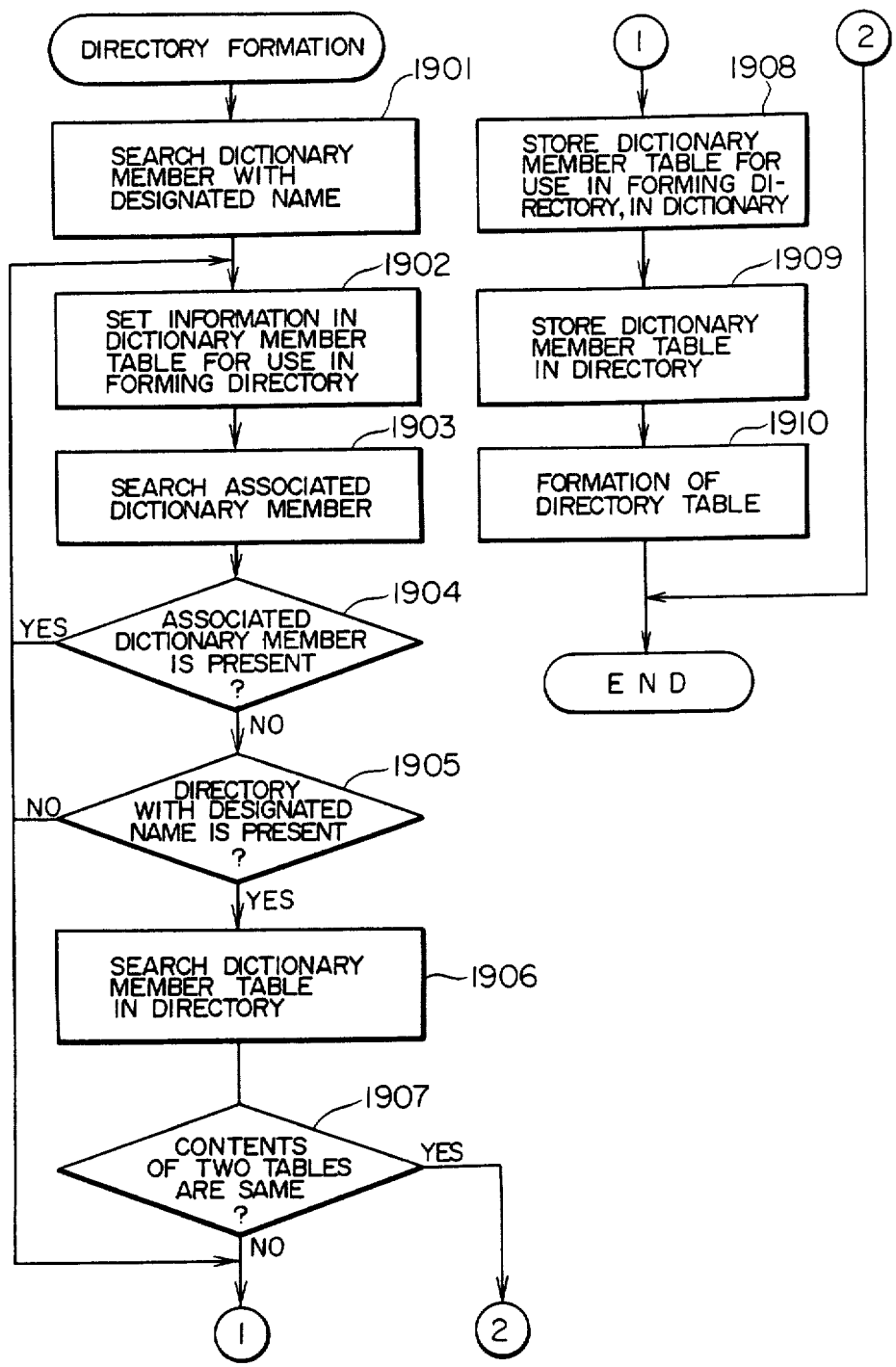
FIG. 17 is a flow chart showing an embodiment of a batch operation process according to the present invention, wherein the directory formation process is incorporated as an example.

Next, a dictionary/directory batch operation during the directory formation process will be described in detail with reference to the flow chart of FIG. 17.

Upon a directory formation command (a command to form a directory based on a designated subschema), a dictionary member having the name designated by the command is first searched from the dictionary (1901). The step will be described in more detail in the following.

An example of a directory to be formed based on the definition information on the subschema and schema, is shown in FIG. 5. In the Figure, the schema name is obtained from the schema definition information, and the subschema name is obtained from the subschema definition information. In forming a directory, the designated name is the subschema name, which is stored in the subschema information in the record 21 of the dictionary member having the structure as shown in FIG. 3. In the directory formation process, a dictionary member having the subschema name designated by the command, is searched.

Next, a dictionary member table for use in forming a directory is implemented in a main storage, and information on the member designated by the directory formation command is set in the table (1902).

Figure 20:
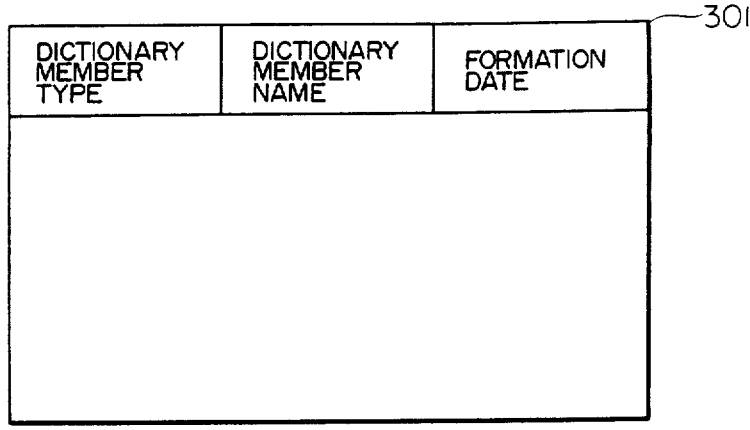
FIG. 20 is a dictionary member table for forming a directory.

The dictionary member table for use in forming a directory has a format shown in FIG. 20. In the Figure, reference numeral 301 denotes an entry of the dictionary member table, which entry is constructed of, for example, a dictionary type, dictionary member name, and date information.

First, the dictionary type (subschema), name and formation date are set in the dictionary member table.

Next, based on the dictionary member, associated dictionary members necessary for forming a directory are searched (1903).

In this case, to obtain schema definition information necessary for forming a directory, member information in the subschema members shown in FIG. 4 and associated with the schema is picked up to thereby search a dictionary member representative of the schema. Schema information thus obtained is also set in the dictionary member table. Thus, a search for associated members is terminated (1904, No).

It is checked to determine if a directory member having the name designated by the command is present by searching the directory group already formed. If not present (1905), the dictionary member table is stored in the dictionary (1908). Information identifying the directory formed based on the dictionary is stored in the dictionary. In this embodiment, the dictionary member names used to form the directory are used as a name of the directory. Therefore, storing the dictionary member table in the dictionary is equivalent to storing information identifying the formed directory. If a directory member having the name designated by the command is present (1905), the dictionary member table stored in the directory is searched (1906) to check if it has the same content as that of the table formed in step 1902 (1907).

Figure 21:
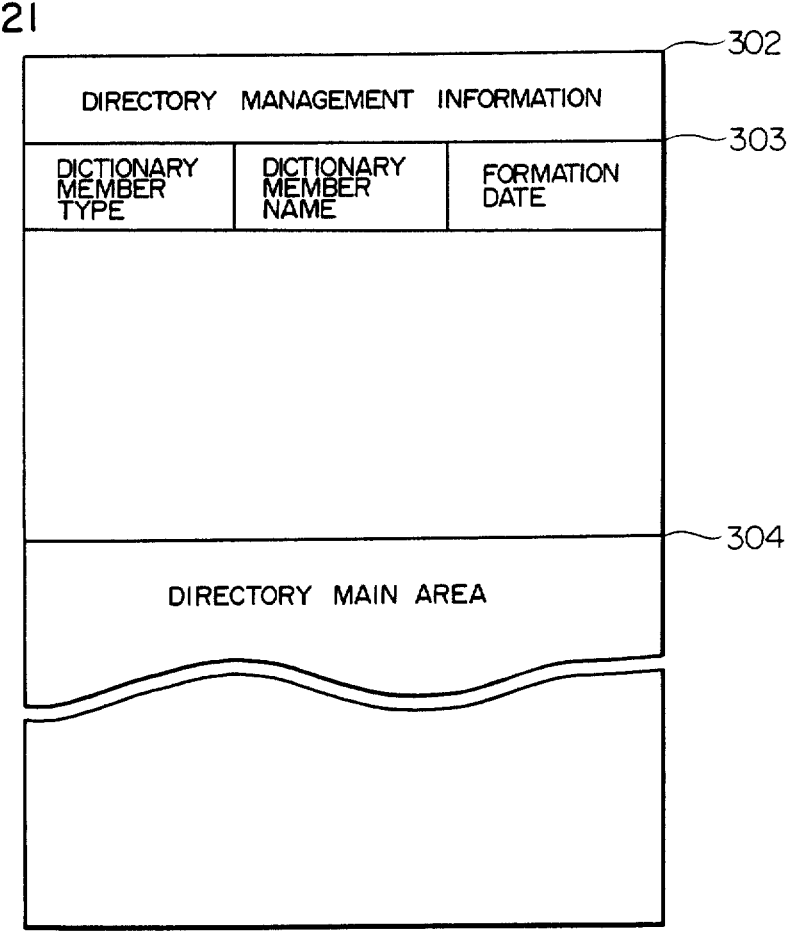
FIG. 21 shows a directory member.

FIG. 21 shows a directory member which is constructed of a directory management area 302, a dictionary member table in the directory for use in forming the directory, and a directory main area 304.

In steps 1906 and 1907, the content of the table just formed is compared with the content of a dictionary member information table in the directory for use in forming a directory. If the contents coincide (1907, Yes), members can be formed and the directory forming process is terminated. If the contents do not coincide (1907, No), the dictionary member table formed in step 1902 is stored in the dictionary (1908), and also in the directory (1909).

Thereafter, the main area of the directory is formed as conventional (1910).

Thus, the record when the directory is formed is stored in the dictionary and the directory, so that formation of members having the same content can be prevented during formation of a directory.

Figure 18:
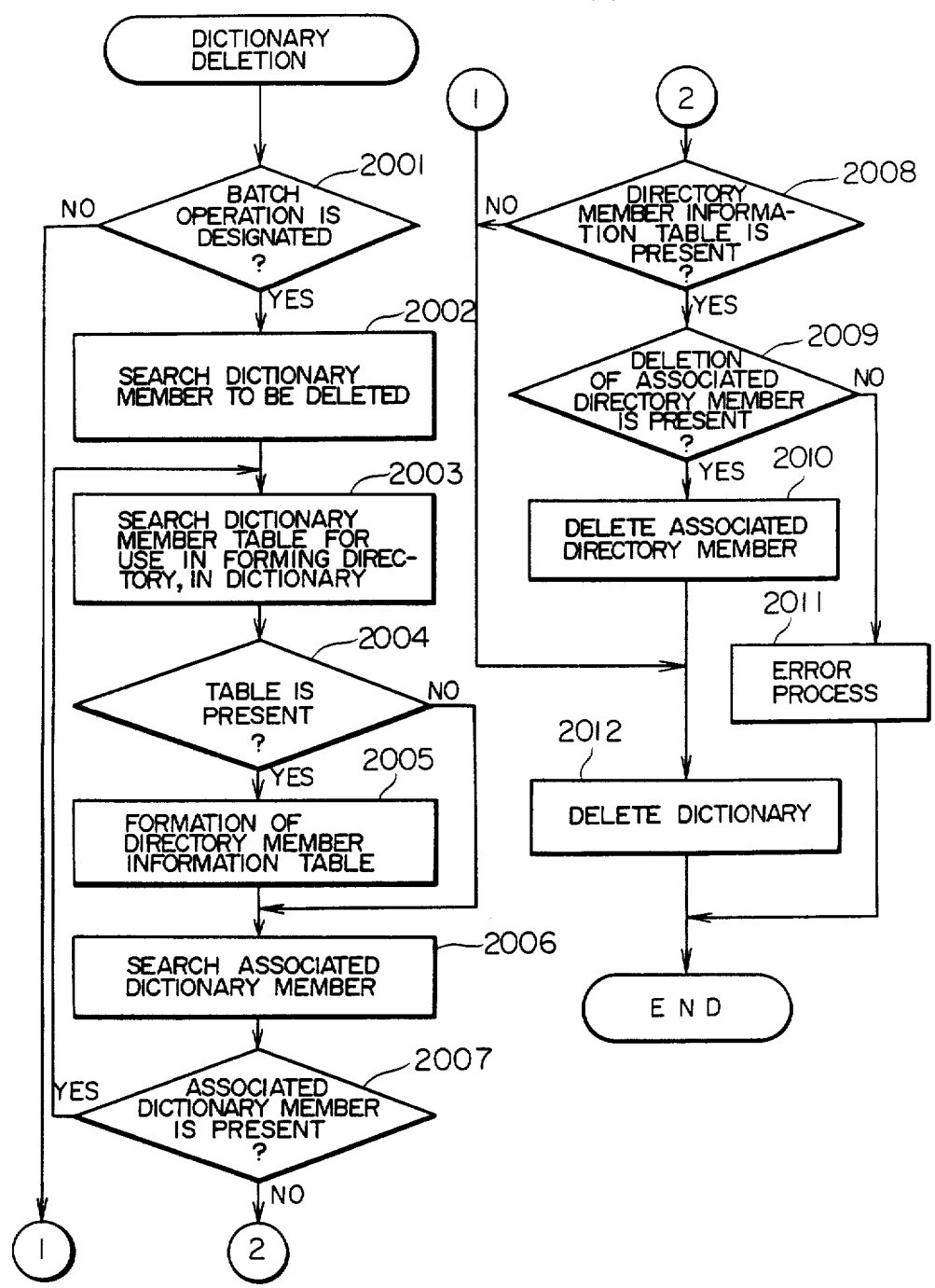
FIG. 18 is a flow chart showing an embodiment of a batch operation process according to the present invention, wherein the dictionary deletion process is incorporated as an example.

Next, a process responsive to a dictionary deletion command to either delete associated dictionary members in a batch manner or to delete only the designated dictionary member, will be described in detail with reference to the flow chart of FIG. 18.

If there is no designation of an optional batch operation for dictionary deletion (2001), the dictionary member is deleted irrespective of the directory (2012).

To delete a dictionary member of subschema in a batch manner, the following statement, for example, is given.

*DELETE DICTIONARY
LINKED FORCE
SUBSCHEMA [subschema name]

"LINKED" is an optional instruction to delete in a batch manner. "FORCE" is an optional instruction to delete a directory member as well as an associated dictionary member if any.

In response to the deletion command (2001, Yes), first a dictionary member of subschema is searched (2002). If a directory has been formed based on the information of the searched subschema, the dictionary member table as described above is present. Therefore, this table is searched to confirm if it is present (2003).

Figure 22:
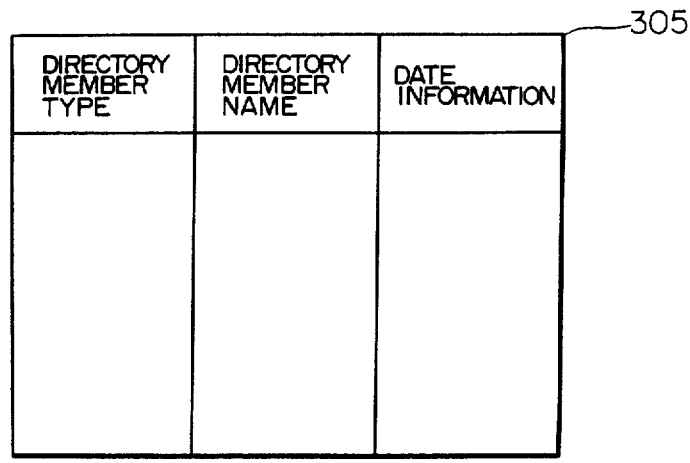
FIG. 22 is a directory member information table.

If present in the dictionary (2004), then an associated directory member is present so that the process can be executed in batch manner. In this case, a directory member information table as shown in FIG. 22 is formed. In the Figure, reference numeral 305 denotes an entry of the directory member information table, which entry is constructed of information sets unambiguously representing directory members, such as a directory type, a directory member name, and date information. Thus, the directory member information table includes associated directory members in a single table.

First, information on the directory formed on the basis of the designated dictionary member to be deleted is stored in the format of the directory member information table (2006). In this embodiment, the entry of the dictionary member table for use in forming a directory is, as discussed previously, information identifying the directory formed on the basis of the dictionary members in which the table is stored. Therefore, the information per se is stored in the directory member information table as directory information.

In a case where the designated dictionary member to be deleted is a schema, an associated dictionary member is a subschema formed using the schema. This subschema is searched based on the record of the schema name and formation date in the subschema.

If an associated dictionary member is present (2007, Yes), associated dictionary member information is similarly written in the directory member information table. Next, in steps 2003 to 2007, it is judged if a directory member information table has been formed (i.e., if a directory has been formed based on the dictionary member to be deleted, or based on the associated dictionary member) (2008). If not present (2008, No), a dictionary deletion process is executed (2012). If present (2008, Yes) and in the case of an optional dictionary deletion request to delete an associated directory member (2009), the associated directory member is deleted (2010) and the dictionary member requested to be deleted is deleted (2012). In the case of an optional request not to delete an associated directory member (2009), an error process is executed (2011) so that neither the dictionary member nor the directory member is deleted.

Figure 19:
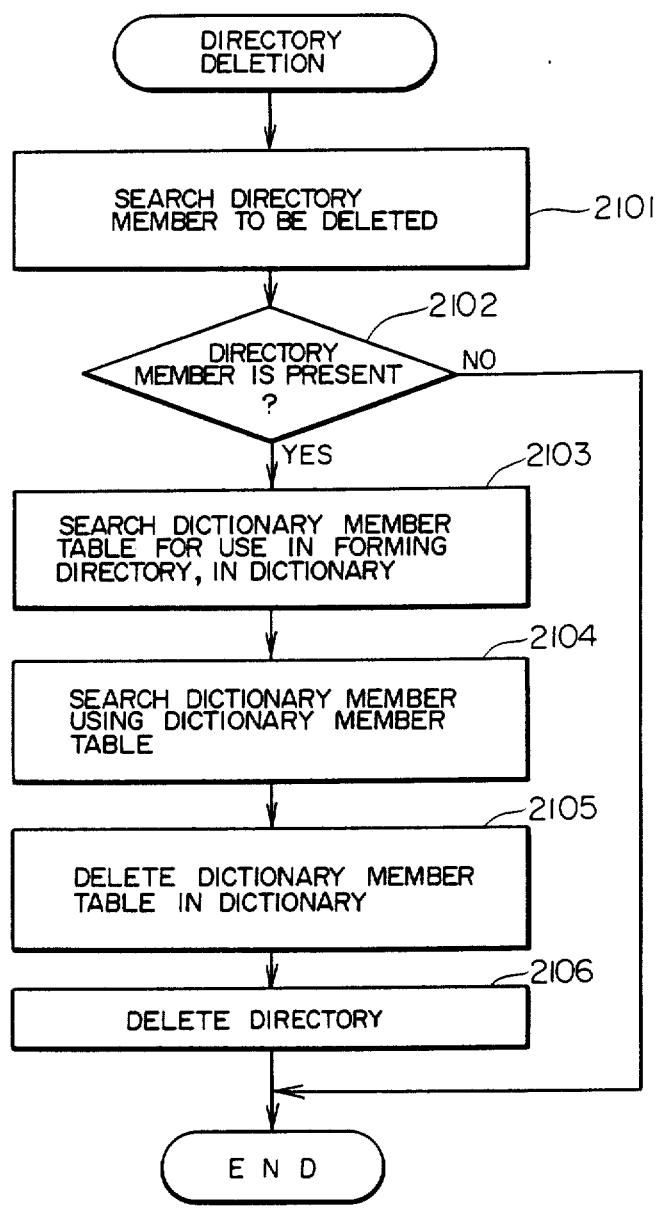
FIG. 19 is a flow chart showing an embodiment of a batch operation process according to the present invention, wherein the directory deletion process is incorporated as an ,example.

The dictionary/directory batch operation during the directory deletion process will be described with reference to the flow chart of FIG. 19.

Upon a directory deletion command, a directory member to be deleted is first searched (2101). If not present (2102), the process is terminated. If present (2102), the dictionary member table in the directory for use in forming a directory is searched (2103). Next, a dictionary member is searched based on the table (2104). After deleting the dictionary member table in the dictionary (2105), the directory member is deleted (2106).

As described so far, in operating the dictionary/directory system according to the present invention, associated definition information is checked as to their mutual relationship using the record or log of the definition information. Therefore, an erroneous operation by the user, which may damage the agreement between definition information of the dictionary/directory, can be avoided. Further, a series of operation for maintaining the agreement can be performed in a batch manner. As a result, the operability and efficiency is advantageously improved in the development, management and maintenance of the system which uses the dictionary/directory system.

We claim:

1. A control method for a database system having a dictionary for storing definition information defining the database structure and a directory for storing a plurality of directory entries wherein each directory entry includes a part of said definition information of said dictionary disposed in a table format, said control method utilizing a programmable digital computer for performing the steps of:

forming new definition information and a corresponding directory entry using definition information to be stored in said dictionary;

storing identification information in said dictionary and said directory, wherein said identification information identifies said definition information used in said forming step; and selectively searching stored identification information for a part of said definition information stored in said dictionary in response to a command to delete said part of said definition information stored in said dictionary, searching said directory for a part of said definition information stored in said directory in response to said command to delete said part of said definition information, deleting said part of said definition information from said dictionary and deleting said corresponding directory entry from said directory, wherein said corresponding directory entry includes said part of said definition information to be deleted.

2. A control method according to claim 1, wherein in said storing step, said identification information includes information identifying said definition information used in said forming step and information identifying corresponding definition information from which said definition information used in said forming step is derived.

3. A control method according to claim 2, wherein said identification information includes information which indicates said definition information is of a particular dictionary information type, a name of said definition information and a formation date of said definition information.

4. A control method according to claim 1, wherein said deleting steps further include, when a corresponding directory entry including said part of said definition information is found, the steps of:

determining whether said part of said definition information may be deleted and outputting information indicating that said part of said definition information is not permitted to be deleted, whereby said determination is made by searching said dictionary and said directory.

5. A control method for a database system having a dictionary for storing definition information defining a database structure and a directory for storing a plurality of directory entries wherein each directory entry includes a part of said definition information of said dictionary disposed in a table format said definition information of said dictionary having a schema representative of the database structure and a subschema re-defining the database structure such that a certain range of said schema is accessible by a user program, said control method utilizing a programmable digital computer for performing the steps of:

forming a directory entry based on said subschema;

storing identification information in said dictionary with said subschema an in said directory with said each directory entry, wherein said identification information identifies said subschema and said schema being redefined by said subschema; and selectively searching stored identification information in response to a command to delete a part of said definition information stored in said dictionary, searching said directory using said part of said definition information to be deleted, deleting said part of said definition information from said dictionary and deleting a directory entry which includes said part of said definition information from said directory.

* * * * *